United States Patent [19]

Winterhoff et al.

[11] Patent Number: 4,952,437

[45] Date of Patent: Aug. 28, 1990

[54] HEAT-SHRINKABLE SLEEVE

[75] Inventors: Hans Winterhoff, Hagen; Christian Kipfelsberger, Hepberg; Andreas Kupczyk, Hagen, all of Fed. Rep. of Germany

[73] Assignee: Firma RXS Schrumpftechnik-Garnituren GmbH, Fed. Rep. of Germany

[21] Appl. No.: 216,587

[22] Filed: Jul. 8, 1988

[30] Foreign Application Priority Data

Jul. 15, 1987 [DE] Fed. Rep. of Germany ....... 3723397

[51] Int. Cl.⁵ .................. B32B 1/00; B32B 27/12; B32B 31/20
[52] U.S. Cl. ........................................ 428/68; 156/85; 156/86; 174/DIG. 8; 285/381; 428/34.9; 428/122; 428/193; 428/247; 428/248; 428/252; 428/255; 428/913
[58] Field of Search ............. 156/85, 86; 174/DIG. 8; 285/381; 428/34.9, 68, 122, 193, 247, 248, 252, 255, 913

[56] References Cited

U.S. PATENT DOCUMENTS

| | | | |
|---|---|---|---|
| 4,421,582 | 12/1983 | Horsman | 156/85 |
| 4,624,720 | 11/1986 | Pithouse et al. | 156/86 |
| 4,631,098 | 12/1986 | Pithouse et al. | 156/86 |
| 4,709,948 | 12/1987 | Archer et al. | 156/86 |
| 4,729,920 | 3/1988 | McLoughlin et al. | 156/85 |
| 4,743,321 | 5/1988 | Soni et al. | 156/86 |
| 4,761,193 | 8/1988 | Pithouse et al. | 156/85 |
| 4,761,194 | 8/1988 | Pithouse ety al. | 156/86 |
| 4,816,309 | 3/1989 | Hutt et al. | 156/86 |
| 4,816,326 | 3/1989 | Jones et al. | 156/86 |

FOREIGN PATENT DOCUMENTS 0117026 8/1984 European Pat. Off. .
7501913.5 7/1975 Fed. Rep. of Germany .
1497051 1/1978 United Kingdom .

Primary Examiner—James C. Cannon
Attorney, Agent, or Firm—Hill, Van Santen, Steadman & Simpson

[57] ABSTRACT

A heat-shrinkable sleeve consisting of at least one heat-shrinkable component and a mechanical reinforcing component secured thereto, characterized by the reinforcing component being permanently secured to the heat-shrinkable component after completion of the heat-shrinking process. The mechanical reinforcing component, preferably, consists of a carrier foil on which mechanical reinforcing elements are arranged and the reinforcing elements are preferably arranged to extend in two directions so that tearing of the sleeve is extremely limited.

37 Claims, 3 Drawing Sheets

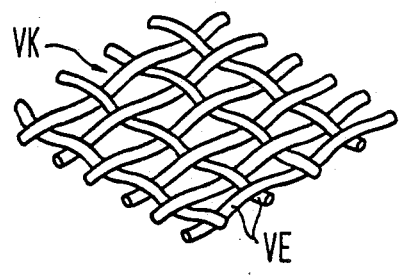
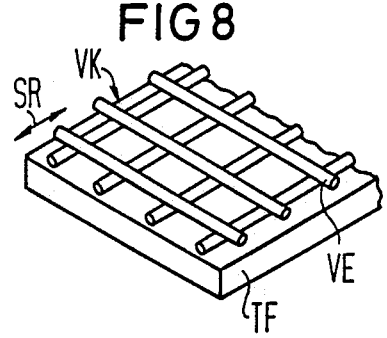
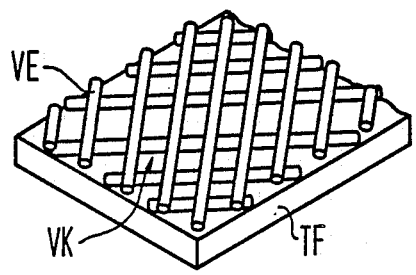
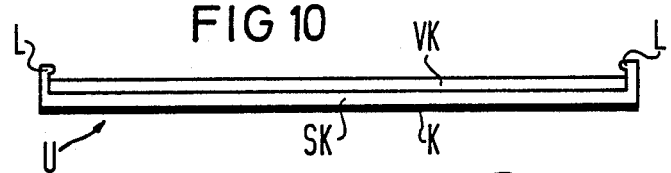
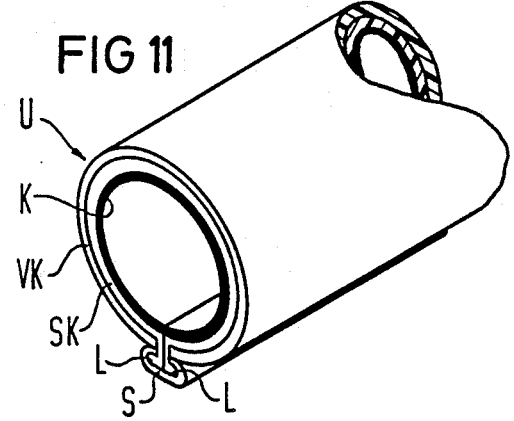

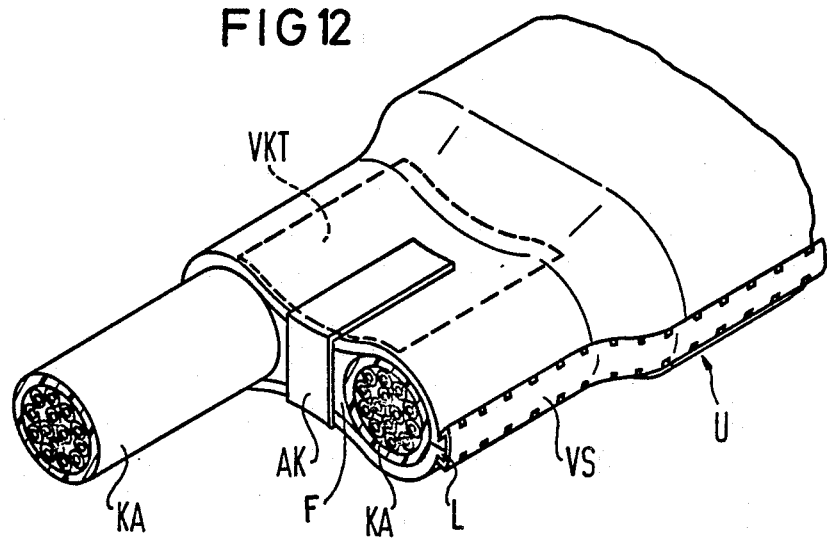

HEAT-SHRINKABLE SLEEVE

BACKGROUND OF THE INVENTION

The present invention is directed to a heat-shrinkable sleeve or envelope consisting of at least one heat-shrinkable component and a mechanically reinforcing component.

British Patent No. 1,497,051, which was the basis of German Gebrauchsmuster 75 01 913, discloses a heat-shrinkable sleeve which includes reinforcing elements in order to reinforce the mechanical properties. However, these elements only extend in a longitudinal direction and are used so that the direction of shrinkage of the sleeve is not influenced by the elements. The result of this structure is that damage to the sleeve, such as, for example, tears in a longitudinal direction, can continue unobstructed. This is particularly dangerous when such damage occurs during assembly of the sleeve, because then during shrinkage of the sleeve further tearing in the longitudinal direction of the sleeve as a result of the shrinkage forces cannot be stopped.

To overcome this problem, for example, cloth or fabrics are used in the European Patent No. 0,117,026, which discloses utilizing a shrinkable fabric which is embedded in a non-shrinkable material. In order to achieve a corresponding high mechanical stability, these fabrics, in addition to the shrinkable fibers which extend in the first shrinking direction, also include non-shrinkable heat-resistant fibers which extend in a second direction of the fabric. Thus, also in the case of these inclusions, fundamentally, only one direction is protected from damage. On the other hand, the production of sleeves consisting of fabrics of this type require a considerable higher outlay than the conventional type and which, by a laminar or tubular extrusion, the required surface structure is already obtained in its unprocessed form.

SUMMARY OF THE INVENTION

A first object of the present invention is to provide a heat-shrinkable sleeve which can be produced in a simple manner and in which mechanical stability is improved so that local damage or cuts do not lead to far reaching defects.

This aim is obtained by an improvement in a heat-shrinkable sleeve having at least one shrinkable component and a mechanically reinforcing component. The improvements are that the shrinkable component consists of a laminar or planar foil which is made of a shrinking compound and which extends over the entire sleeve, said shrinkable component is cross-linked and stretched, the mechanical reinforcing component is arranged at least in sub-areas of the sleeve and is permanently bonded to the shrinkable component, the mechanical reinforcing component contains reinforcing elements which extend at least in the shrinking direction where these reinforcing elements are such that a change of shape corresponding to the shrinkage of the shrinkable component is possible.

Advantages of the invention consist, in particular, in that the heat-shrinkable sleeve can be optimally adapted to the purpose for which it is intended by the selection of the individual components. Thus, the shrinkable component is to be produced in a customary fashion in a simple form by extrusion, cross-linking and stretching. In the production of the shrinkable component, particular attention need not be paid to the mechanical stability as a mechanically reinforcing component is used for this purpose which, again, can be optimally adapted to the respective requirements by a suitable selection of the individual reinforcing elements. Both the components are then permanently bonded in a simple manner to produce a heat-shrinkable product which has optimally adapted shrinkage characteristics and the required mechanical stability. By virtue of the selection and arrangement of the mechanical reinforcing elements, for example the resistance to tearing or tear growth at the edges or in apertures, can also be substantially improved. In addition, a substantial improvement is achieved with respect to bursting strength, pressure tightness and other mechanical properties, such as, for example, wear and the like. Thus, for example, it is also now possible to introduce a tear-resistant aperture into a shrinkable sleeve, which aperture is required for the insertion of a valve or a similar attachment. In the past, this involved considerable difficulties as such apertures expanded during the shrinkage process and finally were able to tear.

By way of contrast, a sleeve in accordance with the present invention overcomes such problems without danger. This tearing resistance is achieved by suitable embedment of reinforcing elements which are aligned in such a manner that the tearing direction or tear growth direction would extend transversely to the elements. This is achieved, for example, by means of a plurality of undirected superimposed reinforcing elements or by a deliberate arrangement of reinforcing elements which extend transversely or at a specific angle to one another as in the case, for example, of a lattice-shaped woven structure. As these mechanical reinforcement components are now fixed either by separate carrier foils or by permanent application to the shrinkage component and in the event of damage, the shrinkage component and, thus, the sealing sleeve can, in each case, tear only to the next reinforcing element which extends transversely to the tearing direction. Thus, the more closely such reinforcing elements are arranged, the smaller is the possibility of the tearing and the tear growth.

In accordance with the present invention, the mechanical reinforcing component can consist of synthetic or natural fibers. Depending upon the application, for example depending on whether additional mechanical stability is required, the individual reinforcing elements can be designed and arranged as individual fiber inclusions extending in different directions as, for example, woven laminar cloths or fabrics or as a lattice comprising individual elements permanently bonded to one another at the intersection points of the elements. Individually or in a compound form, as described in the foregoing, these reinforcing elements are either applied directly to the shrinking component or are arranged on or in a carrier foil and then permanently bonded to the shrinkage component. This has the advantage that the mechanical reinforcing component can be applied to the finish, for example cross-linked and stretched, shrinking component if reinforcing elements are used which stretch either not at all or hardly at all. However, the components can be designed to be such that the shrinkage capacity of the shrinkage component can be fully developed, for example during the shrinking process, so that both the components can be moved, be rearranged or be reshaped relative to one another in a manner that the shrinkage process can take place without obstruction. In the bonded state, the increase level of stability is then re-established, if not acutally increased in comparison to the former state, as now the reinforcing elements are compressed.

Additional layers, consisting, for example, of an adhesive, can be arranged between the individual layers of carrier foil or between the carrier foil and the shrinking component. However, it is often advantageous if the shrinking component and the carrier foil and the mechanical reinforcing components consist of the same basic compound where, however, only the shrinking component is cross-linked and stretched. The same materials can be used to achieve a particular intimate bonding, for example by inter-fusion.

Suitable materials for the shrinkage component are in generally any type of cross-linked, crystalline thermoplastic, such as, for example, cross-linked polyolefins. In particular, polyolefins, which are selected from a group consisting of polyethylene, polybutene, and similar synthetic materials. Following extrusion, the basic materials for the shrinking component are cross-linked by irradiation or by a chemical means and are then stretched to the extent required for maximum shrinkage of the component. For the chemical cross-linking, cross-linking accelerators, for example triallylcyanurate, are added.

Either synthetic or natural fundamental elements can be used for the mechanical reinforcing elements. For example, the synthetic elements may be selected from a group consisting of metals, polyesters, polyurethanes, polyamides, epoxides and glass. The natural fundamental elements can be selected from a group consisting of viscose rayon and cotton. Generally, these materials are used for this purpose in the form of fibers and are introduced in the required compound. However, they must be heat-resistant in relation to the shrinking component, for example, they must retain their mechanical properties even at the shrinking temperature and must neither be melted nor softened.

The situation is different in the case of the carrier foil for the reinforcing element, which, together, form the mechanical reinforcing component. The material used for the carrier foil for this purpose should not melt at the shrinking temperature but should be sufficiently flexible or, when heated, must become sufficiently soft without running to insure that the shrinkage of the shrinking component can fully develop. Suitable materials for this purpose, for example, are, again, polyolefins which, however, are not cross-linked or are not cross-linked to the same degree as the shrinking component. These carrier foils need not stretch, as shrinkage of the carrier foil is unnecessary. The carrier foil serves primarily to fix the reinforcing elements However, it is also possible to use shrinkable or partially shrinkable carrier foils if specific requirements must be fulfilled. This can be useful, for example, in the case of a high level of shrinkage or when zones are to be shrunk to different extents or in the case of similar special conditions. Likewise, it is also possible for the mechanical reinforcing elements to consist of shrinking or partially shrinking materials which then serve a special purpose. Here, it is advantageous to form the compound, for example, using a fusion adhesive to enable a mutual combination to take place between the individual layers.

Other advantages and features will be readily apparent from the following description of the preferred embodiments, the drawings and claims.

BRIEF DESCRIPTION OF THE DRAWINGS

FIG. 7 is a perspective view of a stretched and woven structural components of reinforcing elements;

FIG. 8 is a perspective view of an arrangement of reinforcing elements on a carrier foil where the individual reinforcing elements extend either parallel to or at right angles to the direction of shrinkage;

FIG. 9 is a perspective view of a rhombic arrangement of reinforcing elements on a carrier foil;

FIG. 10 is an end view of a heat-shrinkable sleeve having longitudinal sealing elements in accordance with the present invention;

FIG. 11 is a partial perspective view of the heat-shrinkable sleeve of FIG. 10 wrapped into a tubular configuration; and FIG. 12 is a perspective view of a reinforced zone at an end of a cable distribution sleeve in accordance with the present invention.

DESCRIPTION OF THE PREFERRED EMBODIMENTS

The principles of the present invention are particularly useful when incorporated into a heat-shrinkable sleeve, generally indicated at U in FIGS. 10, 11 and 12.

Figure 1:
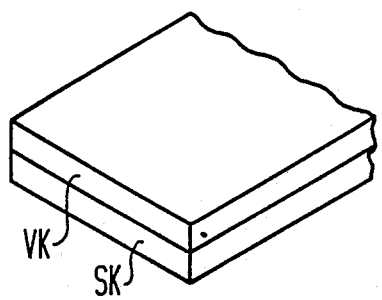
FIG. 1 is a perspective view of a fundamental layer structure for a heat-shrinkable sleeve in accordance with the present invention.

A fundamental construction for a laminar structure to be used in the heat-shrinkable sleeve U is illustrated in FIG. 1. This laminar structure consists, as already described in detail, of a shrinking component SK, which effects the shrinkage. Thus, this component consists of the shrinking compound which is extruded, cross-linked and stretched. The shrinking component SK is permanently bonded to an overlying, reinforcing component VK. The reinforcing component VK consists of individual reinforcing elements which have already been described hereinabove and which, in the example, are directly applied to the shrinking component SK. This reinforcing component is not stretched, for example, and, thus, does not have the shrinking function but only a reinforcing function. However, shrinking or partial shrinking reinforcing components can also be used.

Figure 2:
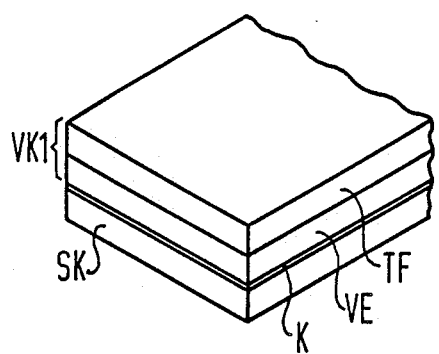
FIG. 2 is a perspective view of a modification of the fundamental structure, wherein the reinforcing component comprises a layer of reinforcing elements and a carrier foil.

A modification of the basic fundamental construction is illustrated in FIG. 2 and has the reinforcing component VK1 consisting of a carrier foil TF to which a layer of reinforcing elements VE are applied. The carrier foil TF, together with the reinforcing elements VE, is applied to the shrinking component SK, either directly, for example by fusing the material of the carrier foil TF and the shrinking component SK together, or by means of an intermediate layer K, which is composed of an adhesive, for example a conventional fusion or meltable adhesive. In some cases it is additionally advantageous that when heat is applied during the shrinking process, as a result of the softening of the meltable or fusion adhesive layer, it is possible to displace the two components relative to one another. This displacement promotes the shrinkage process and the mechanical stability is fully re-established after cooling. Thus, a relaxing stress accommodation of the different layers is, likewise, possible. Such accommodation is also required, for example, When only sub-zones of the carrier foil are stretched and, thus, result in zones with different degrees of shrinkage. The stress conditions must, then, be able to be accommodated in these transitional zones.

Figure 3:
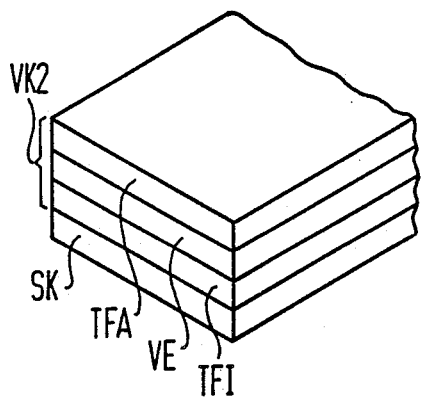
FIG. 3 is a perspective view of another modification of the fundamental structure wherein the reinforcing component has a reinforcing element arranged in one carrier foil or between two carrier foils.

Another modification of the basic structure is illustrated in FIG. 3 and has the layer of reinforcing elements VE embedded between two carrier foils TFA and TFI. Here, the reinforcing component VK2 can be separately produced prior to assembly with the shrinkage component SK as the component element so that the optimum conditions can be selected for each of the components. The representation of the two carrier foils TFA and TFI can also be considered such that only one single carrier foil is present into which the reinforcing elements VE are embedded.

Figure 4:
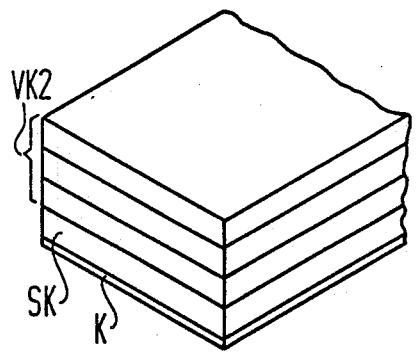
FIG. 4 is a perspective view of the component arrangement of FIG. 3, with an additional adhesive layer.

As best illustrated in FIG. 4, an additional layer K can be provided on a surface of the components, preferably on a surface facing towards the object which is to be encased by the sleeve formed by the components. This layer K consists of an adhesive which is, preferably, a fusion or meltable adhesive. A sealed structure is, thus, obtained as an impervious connection is formed between the shrinkable sleeve and the object which is being wrapped or encased within the sleeve.

Figure 5:
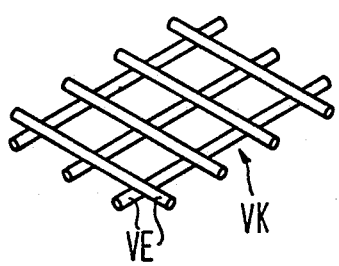
FIG. 5 is a perspective view of an intersecting arrangement of individual reinforcing elements.

The layer of individual reinforcing elements VE, as illustrated in FIG. 5, can be assembled to form a reinforcing component VK in either a loose arrangement or in a fixed cross formation. This structure is then bonded to the shrinking component, either directly or with the carrier foil.

Figure 6:
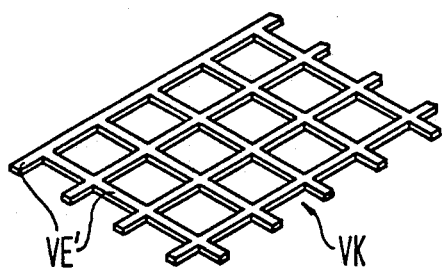
FIG. 6 is a perspective view of a lattice shaped arrangement of an individual reinforcing element.

Instead of utilizing a grid formed of individual elements either loosely arranged together or tied, a lattice-shaped structure VE' can be used as the reinforcing component VK, as illustrated in FIG. 6. The lattice-shaped structure VE' has the characteristics and materials which are selected to be such that during the shrinkage process, the mobility exists which, as far as possible, does not obstruct the shrinkage process. Suitable materials for this purpose are, for example, as already described above, cross-linked synthetic materials which can soften, but do not melt, at the shrinking temperature. After the cooling following the shrinking process, the previous stability will be re-established.

The reinforcing element VK can also be composed of a woven cloth or fabric in which the individual elements VE are mobile in relation to one another and, thus, provide the requisite mobility during the softening of the carrier foils. This permits shape matching during the shrinking process and, in the final state, the reinforcing elements VE are fixed again in the reinforcing effect and protection against tearing and tear growths will exist in full. This arrangement is illustrated in FIG. 7.

As illustrated in FIG. 8, a reinforcing component VK having the reinforcing elements arranged in the pattern, for example, as illustrated in FIG. 7. The arrow SR is to indicate the subsequently applied, shrinking component having a shrinking direct SR, which extends in parallel to one direction of the elements VE and transverse or at right angles to the second direction of the reinforcing elements VE. This insures that tearing or tear growth can take place only up to the next following transverse reinforcing element VE, which is expected in accordance with this invention.

Instead of arranging the reinforcing elements VE to extend parallel to and at right angles to the direction of shrinking, the elements can have a rhomboid arrangement, as illustrated in FIG. 9. This arrangement is selected so that there is no direction-related accentuation of the reinforcing characteristics in accordance with the present invention.

As best illustrated in FIG. 10, the heat-shrinkable sleeve U of the present invention consists of a laminar, shrinking component SK and an overlying reinforcing component VK, which is, preferably, arranged on the outer surface of the sleeve. Each of the longitudinal edges of the sleeve are provided with undercut, partial beads or longitudinal sealing elements L which, in the assembled state as illustrated in FIG. 11, form the sealing elements which have a T-shape in cross section and on which, for example, an adapted sealing bar or clamping element can be drawn.

As illustrated in FIG. 11, the sleeve U is assembled with the two longitudinal sealing elements L engaging each other and held by a bar or rail S. In this case, the reinforcing component VK is arranged on the exterior of the sleeve and the interior of the sleeve is provided with the adhesive layer K. When heat is applied, the shrinking component SK will effect the shrinkage, the adhesive layer effects the sealing and the outer reinforcing component VK provides protection against environmental and mechanical influences.

An exemplary embodiment of the use of a mechanical reinforcing component VKT in a sub-zone or region of the sleeve U, which is in the form of a cable distribution sleeve, is illustrated in FIG. 12. Inserted in the sub-zone between the two inserted cables KA is a branch clamp AK, which has a U-shape and has two flanks or legs, which embrace the sleeve. In an inner gusset zone, for example between the two cables KA, a filler component F is arranged against which the sleeve is pressed by the clamp AK. During the shrinking process, considerable mechanical stresses will occur in this region in comparison to other zones of the sleeve used so that the danger of tearing and tear growths is particularly great. This is prevented in accordance with the construction of the present invention by the mechanical reinforcing component VKT in this sub-zone or region. This Figure also shows the longitudinal seal with the two longitudinal beads L in the fitted sealing bar or clamp VS.

As already mentioned, it is possible for the reinforcing component VK and, thus, the carrier foil TF and/or the reinforcing elements VE to, likewise, be shrinkable at least in the sub-zones. This allows the production of arbitrary variations which can be optimally adapted to the particular requirements.

Furthermore, along the longitudinal edges of the sleeve, the reinforcing component VK can be extended beyond the shrinkable component SK to form a lower step. Thus, in the assembled state of the sleeve, the longitudinal gap can be covered and sealed.

A partial use of the mechanical reinforcing component VK is possible, which, by virtue of the resistance of the component VK to tearing, can also be suitable, for example, for the use of a sealing element, such as studs, staples or the like. Such elements, together with the mechanical reinforcing component VK, can form a branch for a cable distribution sleeve. In the past, such designs were not possible for shrinkable sleeves as the sealing elements and the shrinkable components would be torn.

When the sleeve is used for objects consisting of fusable synthetic materials, such as, for example, a synthetic cable sleeve or objects provided with such a coating, it is advantageous that on the facing side an internal coating, which melts at the shrinking temperature, likewise, is applied to the sleeve, for example a polyethylene coating with a low melting point (long-density polyethylene). In this way, a particularly good seal can be achieved by material inter-fusion.

Elastic elements, consisting of materials such as rubber or the like, can also be used for the shrinkable component SK. In such cases, these elastic elements are embedded in the stretched state in or between synthetic plates which soften when heated. When supplied with heat, these synthetic plates then soften and the "frozen-in" elastic forces result in an overall regeneration in terms of the shrinkage. Following cooling, the conventional stability of shape is then re-established.

Although various minor modifications may be suggested by those versed in the art, it should be understood that we wish to embody within the scope of the patent granted hereon all such modifications as reasonably and properly come within the scope of our contribution to the art.

We claim:

1. In a heat-shrinkable sleeve having at least one heat-shrinkable component and a mechanical reinforcing component, the improvements comprising the shrinkage component consisting of a foil, which is made of a shrinkable compound and which extends over the entire sleeve, said shrinkable component being cross-linked and stretched, said mechanical reinforcing component being arranged at least in sub-zones of the sleeve and being permanently bonded to the shrinkable component, said mechanical reinforcing component containing reinforcing elements which extend, at least, in the shrinkage direction where these reinforcement elements are such that a change in the shape corresponding to the shrinkage of the shrinkable component is possible, said reinforcing elements consisting of synthetic material.

2. In a heat-shrinkable sleeve according to claim 1, wherein the mechanical reinforcing component is applied to one side of the foil of the shrinking component.

3. In a heat-shrinkable sleeve according to claim 1, wherein the reinforcing component is formed by a layer of reinforcing elements applied to one side of an unstretched carrier foil and the carrier foil is permanently connected to the shrinkable component.

4. In a heat-shrinkable sleeve according to claim 3, wherein an adhesive agent, preferably a meltable adhesive, is arranged between the carrier foil and shrinkable component.

5. In a heat-shrinkable sleeve according to claim 3, wherein the carrier foil and shrinkable component preferably consists of the same basic compound and the bonding between the carrier foil and shrinkable component takes place by material fusion.

6. In a heat-shrinkable sleeve according to claim 1, wherein the reinforcing component comprises a layer of reinforcing elements embedded in an unstretched carrier foil and the carrier foil is permanently connected to the shrinkable component.

7. In a heat-shrinkable sleeve according to claim 1, wherein the mechanical reinforcing component includes a layer of reinforcing elements embedded between two unstretched carrier foils and one of the two carrier foils is connected to the shrinkable component.

8. In a heat-shrinkable sleeve according to claim 7, wherein the two carrier foils consist of different materials.

9. In a heat-shrinkable sleeve according to claim 1, wherein a layer of meltable adhesive is arranged at least on part of an inner surface of the sleeve.

10. In a heat-shrinkable sleeve according to claim 1, wherein the reinforcing elements are formed by extension-resistant fibers.

11. In a heat-shrinkable sleeve according to claim 1, wherein the mechanical reinforcing component has reinforcing elements consisting of a woven fabric.

12. In a heat-shrinkable sleeve according to claim 1, wherein the mechanical reinforcing component has reinforcing elements formed by a lattice structure.

13. In a heat-shrinkable sleeve according to claim 1, wherein said synthetic material is selected from a group consisting of polyester, polyurethane, polyamide and glass.

14. In a heat-shrinkable sleeve according to claim 1, wherein the mechanical reinforcing components applied to the shrinkable component only partially in those sub-areas of the sleeve which are subject to particular mechanical stresses.

15. In a heat-shrinkable sleeve according to claim 14, wherein said sub-regions are preferably edge zones and the region for entrance apertures and branching zones.

16. In a heat-shrinkable sleeve according to claim 1, which includes a plurality of reinforcing components being arranged one on another.

17. In a heat-shrinkable sleeve according to claim 1, wherein the mechanical reinforcing component includes mechanical reinforcing elements consisting of different materials, particularly a mixture of natural and synthetic elements.

18. In a heat-shrinkable sleeve according to claim 1, wherein the mechanical reinforcing component comprises individual reinforcing elements which are mobile relative to one another.

19. In a heat-shrinkable sleeve according to claim 18, wherein said reinforcing elements are in a woven structure.

20. In a heat-shrinkable sleeve according to claim 1, wherein the mechanical reinforcing component includes individual reinforcing elements secured relative to one another.

21. In a heat-shrinkable sleeve according to claim 20, wherein the secured elements form a lattice-shaped structure.

22. In a heat-shrinkable sleeve according to claim 1, wherein the mechanical reinforcing component is arranged on an exterior of the sleeve.

23. In a heat-shrinkable sleeve according to claim 1, wherein the mechanical reinforcing component is arranged on the inside of the sleeve.

24. In a heat-shrinkable sleeve according to claim 23, wherein the mechanical reinforcing component extends to form a lower step.

25. In a heat-shrinkable sleeve according to claim 1, wherein a mechanical reinforcing component is arranged on both the inside and the outside of the sleeve and, preferably, the inner mechanical reinforcing component is extended to form a lower step.

26. In a heat-shrinkable sleeve according to claim 1, wherein the reinforcing elements consists of cross-linked synthetic material.

27. In a heat-shrinkable sleeve according to claim 1, wherein the mechanical reinforcing component includes a synthetic carrier foil of a cross-linked material.

28. In a heat-shrinkable sleeve according to claim 1, wherein the mechanical reinforcing component comprises a synthetic material having a cross-linking accelerator consisting of triallylcyanurate.

29. In a heat-shrinkable sleeve according to claim 1, wherein the mechanical reinforcing component has reinforcing elements which are stretched.

30. In a heat-shrinkable sleeve according to claim 29, wherein the reinforcing elements consist of rubber and are embedded in a layer of material.

31. In a heat-shrinkable sleeve according to claim 1, wherein the mechanical reinforcing component is at least partially shrinkable.

32. In a heat-shrinkable sleeve according to claim 1, wherein the mechanical reinforcing component comprises reinforcing elements that are at least in part shrunk and restretched.

33. In a heat-shrinkable sleeve according to claim 1, wherein a layer of a low melting point material, preferably a polyethylene layer that is a long-density polyethylene, is arranged on the inside surface of the sleeve.

34. In a heat-shrinkable sleeve according to claim 1, wherein the sleeve on longitudinal edge portions has mechanical reinforcing components and sealing elements are introduced into said region.

35. In a heat-shrinkable sleeve according to claim 1, wherein the mechanical reinforcing component includes a carrier foil, which is at least partially shrinkable.

36. In a heat-shrinkable sleeve having at least one heat-shrinkable component and a mechanical reinforcing component, the improvements comprising the shrinkage component consisting of a foil, which is made of a shrinkable compound and which extends over the entire sleeve, said shrinkable component being cross-linked and stretched, said mechanical reinforcing component being arranged at least in sub-zones of the sleeve and being permanently bonded to the shrinkable component, said mechanical reinforcing component containing reinforcing elements consisting of natural fibers, which elements extend, at least, in the shrinkage direction where these reinforcement elements are such that a change in shape corresponding to the shrinkage of the shrinkable component is possible.

37. In a heat-shrinkable sleeve according to claim 36, wherein said natural fibers are selected from a group consisting of cotton and viscose rayon.

* * * * *